(12) United States Patent
Favalora et al.

(10) Patent No.: US 6,570,681 B1
(45) Date of Patent: May 27, 2003

(54) SYSTEM AND METHOD FOR DYNAMIC OPTICAL SWITCHING USING A DIFFRACTIVE OPTICAL ELEMENT

(75) Inventors: Gregg E. Favalora, Cambridge, MA (US); Rick K. Dorval, Goffstown, NH (US)

(73) Assignee: Actuality Systems, Inc., Reading, MA (US)

( * ) Notice: Subject to any disclaimer, the term of this patent is extended or adjusted under 35 U.S.C. 154(b) by 0 days.

(21) Appl. No.: 09/648,313

(22) Filed: Aug. 25, 2000

(51) Int. Cl.[7] .................................................. G02B 6/32
(52) U.S. Cl. .............................. 359/17; 359/18; 359/16; 359/24
(58) Field of Search ............................... 385/17, 18, 16, 385/24, 33, 10, 14; 359/139, 178, 117, 109, 123

(56) References Cited

U.S. PATENT DOCUMENTS

| | | | | |
|---|---|---|---|---|
| 4,859,012 A | * | 8/1989 | Cohn | 359/223 |
| 4,877,297 A | * | 10/1989 | Yeh | 359/11 |
| 5,037,173 A | | 8/1991 | Sampsell et al. | |
| 5,159,473 A | * | 10/1992 | Feldman | 359/1 |
| 5,165,104 A | * | 11/1992 | Weverka | 385/14 |
| 5,255,332 A | | 10/1993 | Welch et al. | |
| 5,325,224 A | * | 6/1994 | Lang et al. | 359/117 |
| 5,576,873 A | * | 11/1996 | Crossland et al. | 359/109 |
| 6,002,818 A | * | 12/1999 | Fatehi et al. | 385/16 |

FOREIGN PATENT DOCUMENTS

| | | |
|---|---|---|
| EP | 0 717 571 A2 | 6/1996 |
| WO | WO 96/01443 | 1/1996 |

OTHER PUBLICATIONS

Broomfield et al., "Programmable Binary Phase–only Optical Device Based on Ferroelectric Liquid Crystal SLM," *Electron. Lett.*, 22:26–27, 1992.

Crossland et al., "Spatial–Light–Modulator Based Routing Switches," *Inst. Phys. Conf.*, 139:II:177–182, Aug. 22–25, 1994.

(List continued on next page.)

*Primary Examiner*—Mohammad Sikder
(74) *Attorney, Agent, or Firm*—Fish & Richardson P.C.

(57) ABSTRACT

An optical crossbar switch system includes: a mask comprising multiple patterns, wherein at least one of the multiple patterns is a diffractive pattern; and a spatial light modulator positioned to receive at least one optical input beam and selectively couple at least a portion of each of the at least one input beam to one of the patterns of the mask, each coupled portion defining an intermediate beam, wherein each pattern, when selected by the spatial light modulator, is configured to redirect the intermediate beam to one of N targets, where N is an integer greater than two. Further, a method for selectively coupling at least one input beam to one of multiple output channels includes: selectively coupling at least a portion of each of the at least one input beam to one of multiple patterns on a mask; and diffracting at least one of the coupled portions from the mask to one of the output channels.

52 Claims, 9 Drawing Sheets

OTHER PUBLICATIONS

Hossack et al., "Computer Generated Optical Fan–out Element," *Optical Communications*, 68:2:97–102, Sep. 15, 1988.

Kirk et. al., "A Compact and Scalable Free–Space Optical Crossbar," *Proceedings of the Third International Conference on Holographic Systems, Components and Applications*, 1574:137–141 IEE, London, (Sep. 1991).

O'Brien et al., "A Compact Holographically Routed Optical Crossbar Using a Ferroelectric Liquid–Crystal Over Silicon Spatial Light Modulator," *Inst. Phys. Conf.*, 139:II:187–190, Aug. 22–25, 1994.

O'Brien et al., "Dynamic Holographic Interconnects that use Ferroelectric Liquid–Crystal Spatial Light Modulators," *Applied Optics*, 33:14:2795–2803, May 10, 1994.

White et al., "Development of an Optical Free–Space Crossbar," *Inst. Phys Conf.*, 139:II:183–186, Aug. 22–25, 1994.

D. Kim et al., "An OEIC–Integrable Diffractive Optical Element,", Laser and Electro–Optics Society Annual Meeting, 1995, pp. 293–294, Oct. 30, 1995.

S Urushidani et al., "A High–Performance Switch Architecture for Free–Space Photonic Switching Systems," IEICE Trans. Comun., vol. E82–B, No. 2, pp. 298–305, Feb. 1999.

* cited by examiner

SYSTEM AND METHOD FOR DYNAMIC OPTICAL SWITCHING USING A DIFFRACTIVE OPTICAL ELEMENT

TECHNICAL FIELD

This invention relates to optical switching, e.g., reconfigurably interconnecting multiple optical input signals to multiple optical output signals.

BACKGROUND

Optics and photonics are finding many applications in modern technology, including, e.g., optical communication, optical computing, and visual displays. In such applications, light beams carry information as optical signals. Often it is necessary to dynamically redirect one or more of such light beams to one or more selected targets. For example, operators of fiber optic networks typically manage bandwidth demands, channel redundancy, and channel faults by reconfiguring fiber optic pathways at one or more switching nodes.

A module for redirecting one or more optical input signals to one or more optical output signals is known as an optical crossbar switch. For example, an M×N optical crossbar switch reconfigurably connects each of M optical input channels to none, one, or many of N optical output channels. In some cases, M equals N, while in other cases, M is not equal to N. Such a device may include a spatial light modulator (SLM) having at least M by N independently addressable elements for controlling reflection and/or transmission. For example, input optics can be used to fan-out the output of each of a horizontal array of emitters onto a corresponding column of the SLM. Output optics can then be used to fan-in the output from each row of the SLM to a corresponding one of a vertical array of detectors.

SUMMARY

The invention features a compact and versatile optical crossbar switch that exploits the properties of a diffractive optical element (DOE). The diffractive optical element is a substrate having multiple diffractive patterns. Each diffractive pattern causes an incident beam to be directed along a selected direction. As a result, the DOE can steer multiple beams along multiple, separate directions. Because the multiple diffractive patterns that provide such beam steering can be made on a single substrate, the DOE is also small and compact. The optical crossbar switch combines the DOE with a spatial light modulator (SLM) having multiple addressable elements.

The DOE permits more compact and versatile optical arrangements for the SLM. In particular, the DOE element can redirect multiple light signals modulated by the SLM to accommodate multiple, spatially separated target locations. Moreover, because the DOE can be used to accommodate such multiple target locations, the SLM can also accommodate many input arrangements for the optical beams incident on the SLM. In particular, input arrangements may be selected that better exploit the spatial extent of the SLM. For example, each input optical signal may illuminate a circular or elliptical section of the SLM, as an alternative to a section of the SLM having a high aspect ratio, such as a row or column. Moreover, such illuminated circular or elliptical sections of the SLM may be closely packed, e.g., as a hexagonal array, to thereby optimize the throughput of the SLM. Any of the above features may improve packaging constraints on a module incorporating the optical crossbar switch. Furthermore, in embodiments where the elements of the SLM may themselves redirect incident beams (e.g., a MEMS device), the DOE can compound such redirection, thereby expanding the dynamic range of the SLM.

The optical crossbar switch including the DOE can be used in a WDM fiber optic network for reconfiguring fiber optic channels, as well as in other applications, such as dynamic three-dimensional displays.

In general, in one aspect, the invention features an optical crossbar switch system. The system includes: a mask including multiple patterns, wherein at least one of the multiple patterns is a diffractive pattern; and a spatial light modulator positioned to receive one or more optical input beams and selectively couple at least a portion of each optical input beam to one of the patterns of the mask. Each coupled portion defines an intermediate beam, and each pattern, when selected by the spatial light modulator, is configured to redirect the intermediate beam to one of N targets, where N is an integer greater than two.

Embodiments of the optical crossbar switch system may include any of the following features.

There may be only one optical input beam, and the multiple patterns may include N patterns. Furthermore, there may be a one-to-one correspondence between the N patterns and the N targets, and each pattern, when selected by the spatial light modulator, is configured to redirect the intermediate beam to the corresponding target.

Alternatively, there may be M optical input beams, where M is an integer greater than one. Moreover, the mask may include M regions, each pattern being in one of the M regions. Furthermore, there may be a one-to-one correspondence between the M input beams and the M regions, with the spatial light modulator positioned to selectively couple each of the input beam portions to the corresponding region of the mask. Also, there may be M×N patterns, with each region of the mask including N of the patterns. Furthermore, there may be a one-to-one correspondence between the N patterns in each region of the mask and the N targets, with each pattern in each region, when selected by the spatial light modulator, configured to redirect the intermediate beam to the corresponding target. In any of such embodiments, M may be equal to N, or M may be different from N.

The modulator may include an array of multiple elements. The multiple elements may be individually, electronically controllable to cause the spatial light modulator to selectively couple each of the input beam portions to the corresponding one of the multiple patterns. The multiple elements may include a reflective component having an adjustable orientation. Alternatively, the multiple elements may adjustably vary the magnitude of transmission or reflection of an incident beam. The multiple elements may include a liquid crystal cell, e.g., to adjustably vary the polarization of an incident beam. In addition to the liquid crystal cell, the elements may include one or more polarizers. The crossbar system may further include an electronic processor coupled to the spatial light modulator to cause the modulator to selectively couple the input beam portions to the corresponding one of the multiple patterns. The array of multiple elements may be, e.g., a one-dimensional array, a two-dimensional array, or a hexagonal array.

The spatial light modulator may be positioned to receive each of the one or more input beams on, for example, a substantially circular section of the elements, or along a row or column of the elements.

The mask may be a prefabricated to include fixed patterns. Alternatively, the mask itself may be a spatial light modulator providing reconfigurable patterns. At least some of the multiple patterns of the mask may be diffractive patterns. For example, all of the multiple patterns of the mask may be diffractive patterns. The patterns on the mask may be spatially separated from one another.

The diffractive pattern may be a transmissive or reflective diffractive pattern, for example, a transmissive or reflective grating pattern. The grating pattern may be optimized for a particular order of diffraction, e.g., for first order diffraction. The grating pattern may be, e.g., a blazed grating pattern or a holographic grating pattern. The diffractive pattern may include phase-modulation, amplitude-modulation, or phase-modulation and amplitude modulation. The diffractive pattern may be defined, e.g., by an etched pattern on the mask or by a coated pattern on the mask.

The mask may be flat or curved.

The system may further include an intermediate optic positioned between the spatial light modulator and the mask. For example, the intermediate optic may be a mirror, a lens, a microlens array, a polarizer, a wave plate, or a beam splitter. The system may further including a source for the input optical beam(s). Furthermore, the system may include an intermediate optic positioned between the source and the spatial light modulator. Again, for example, the intermediate optic may be a mirror, a lens, a microlens array, a polarizer, a wave plate, or a beam splitter.

The source of the input beams may include an array of optical input fibers, each fiber carrying one of the optical input beams. It may further include a laser source optically coupled to the optical fiber array.

The M optical input beams may each have a different wavelength, and their source may include an input fiber carrying optical signals at different wavelengths and a wavelength division demultiplexer optically coupled to the fiber for separating the optical signals into at least some of the M optical input beams. The source may further include a laser source optically coupled to the fiber.

The system may further include an array of N optical output fibers, which define the N targets. Alternatively, for example, the system may further include an array of N detectors, which define the N targets. Also, the system may further include a wavelength division multiplexer having N inputs, which define the N targets, and an output fiber coupled to the wavelength division multiplexer for carrying optical signals derived from the output beams.

In another aspect, the invention features a method for selectively coupling each of one or more input beams to one of multiple output channels. The method includes: selectively coupling at least a portion of each input beam to one of multiple patterns on a mask; and diffracting at least one of the coupled portions from the mask to one of the output channels. A spatial light modulator may be used to do the selectively coupling step. Embodiments of the method may further include any of the features described above with respect to the optical crossbar system.

Other features, aspects, and advantages follow.

DESCRIPTION OF DRAWINGS

FIG. 1a is a schematic diagram of the switch. FIG. 1b is a plan view of the SLM in the switch. FIG. 1c is a plan view of the DOE in the switch.

DETAILED DESCRIPTION

The invention features an optical system for redirecting one or more optical input signals to one or more optical output channels.

Figure 1A:
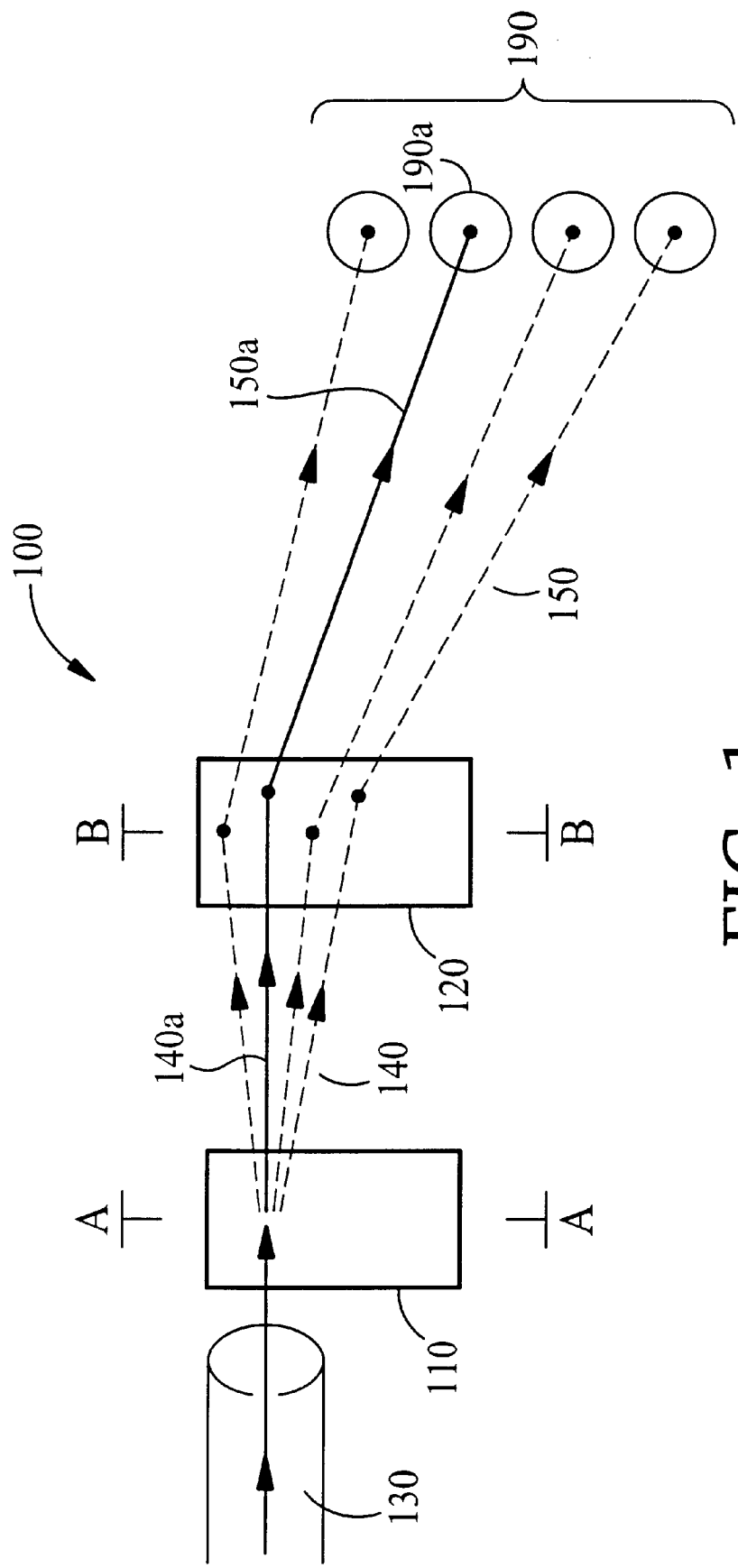
FIGS. 1a, 1b, and 1c are diagrams of a 1×N optical crossbar switch.
Figure 1B:
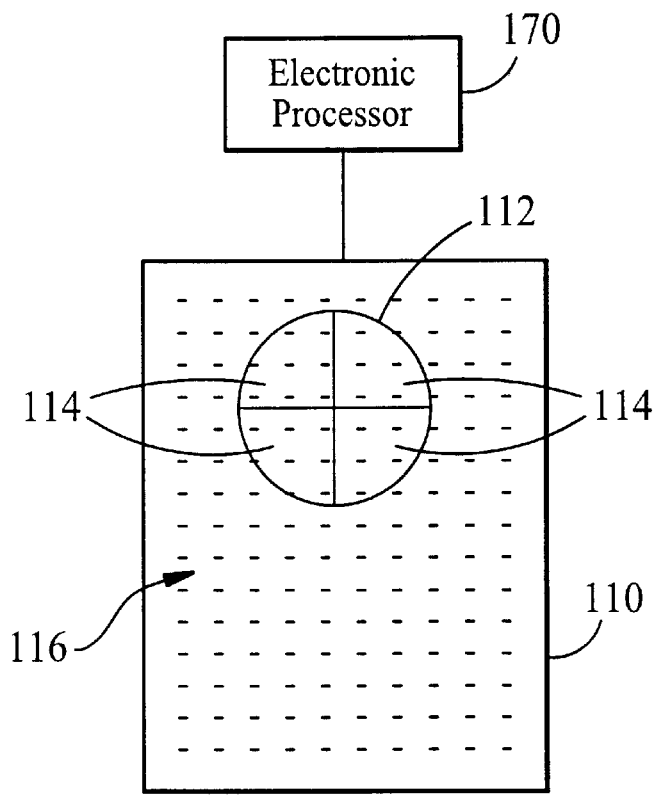

FIG. 1a is a schematic diagram of a 1×N optical crossbar switch 100. Switch 100 includes a spatial light modulator (SLM) 110 and a diffractive optical element (DOE) 120. An input optical beam 130 is incident on SLM 110. Referring to FIG. 1b, SLM 110 includes multiple, independently addressable elements 116 for optically manipulating incident light. As shown in FIG. 1b (plan view along plane A—A in FIG. 1a), input optical beam 130 illuminates a section 112 of SLM 110, with section 112 divided into N subsections 114 each containing one or more elements 116.

The elements of SLM 110 are addressed to selectively couple the portion of input optical beam 130 incident on each of the N subsections 114 to a corresponding one of N diffractive patterns on DOE 120 as an intermediate beam 140 (shown in FIG. 1a). For example, the elements of the SLM can be addressed to selectively not couple the intermediate beams to the patterns on the DOE, couple one intermediate beam to one of the patterns on the DOE, or couple more than one intermediate beam to more than one corresponding patterns on the DOE. For the selection shown in FIG. 1a, intermediate beam 140a is illustrated as a solid line to indicate that SLM 110 couples it to DOE 120, but not the other intermediate beams, which are illustrated as dashed lines.

Figure 1C:
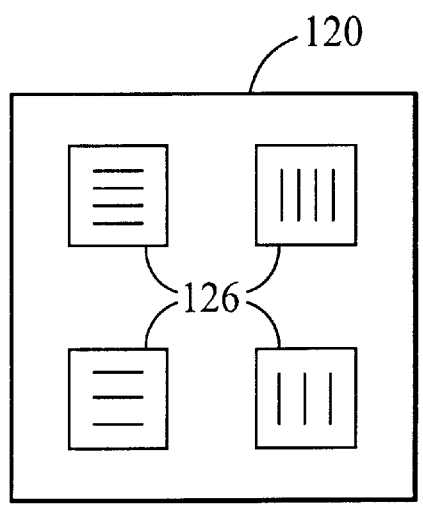

As shown in FIG. 1c (plan view along plane B—B in FIG. 1a), DOE 120 includes the N diffractive patterns 126. The patterns can be continuous with one another, e.g., partially overlap, or be spatially separated, as illustrated in FIG. 1c. Referring again to FIG. 1a, each diffractive pattern on DOE 120 redirects the corresponding intermediate beam 140 to define a corresponding optical output beam 150, which the DOE directs to a corresponding target 190, e.g., a detector, optical fiber, fiber optic coupler, lens, mirror, screen, or other such optical elements. Again, for the selection shown in FIG. 1a, output beam 150a is illustrated as a solid line because it was derived from the only intermediate beam coupled by SLM 110 to DOE 120, the other output beams are illustrated as dashed lines. As shown, output beam 150a is directed to target 190a.

The embodiment depicted in FIGS. 1a, 1b, and 1c depicts a 1×N optical crossbar switch 100 with N=4. Accordingly, there are four subsections 114 in section 112 of SLM 110, four possible intermediate beams 140, four diffractive patterns 126 on DOE 120, four possible output beams 150, and four targets 190. In other embodiments, N can be an integer greater than four or less than four.

Figure 2:
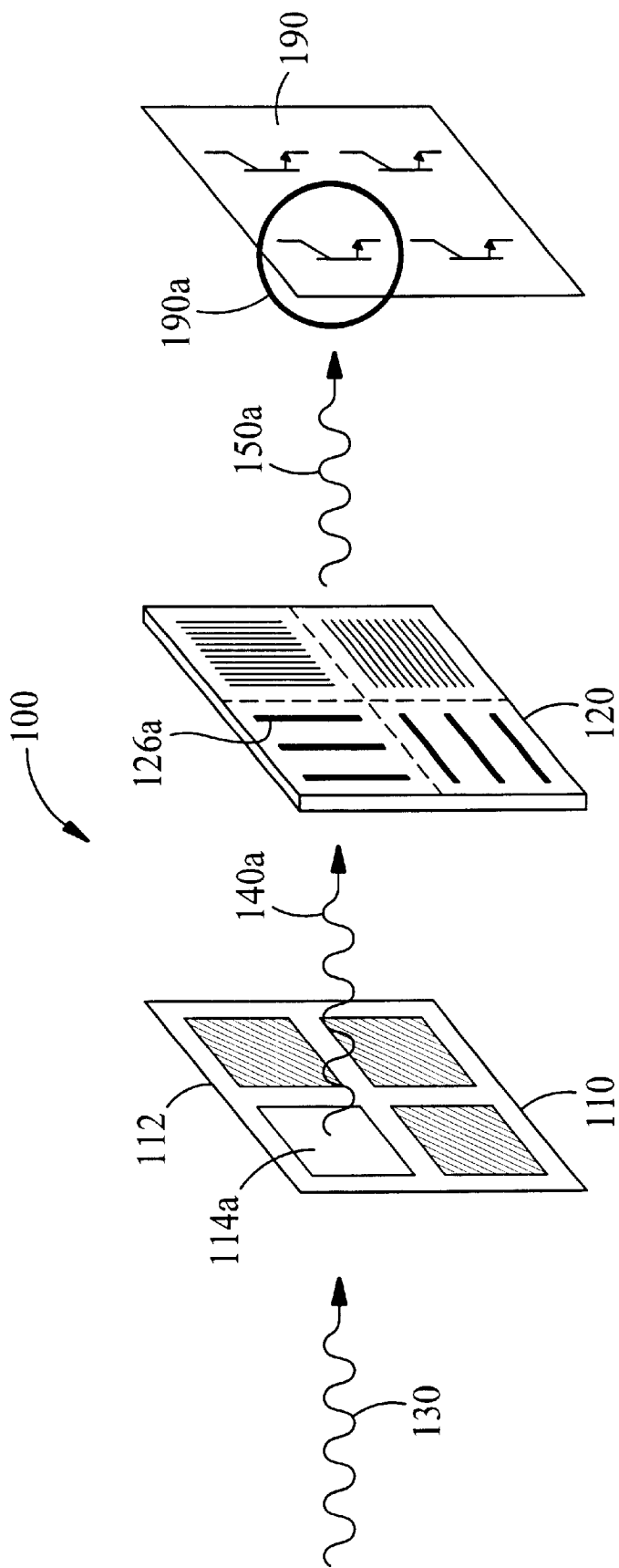
FIG. 2 is a perspective view of the switch shown in FIGS. 1a–1c.

FIG. 2 is a perspective drawing of 1×4 crossbar switch 100 during operation. Subsection 114a of SLM 110 selectively couples a portion of input beam 130 to pattern 126a on DOE 120 as intermediate beam 140a. Pattern 126a diffracts intermediate beam to target 190a as output beam 150a.

In the embodiment shown in FIGS. 1a, 1b, 1c, and 2, input beam 130 has a substantially circular profile on SLM 110, with subsections 114 of SLM 110 dividing the input beam into four quarters to define sources for the intermediate beams. Other embodiments can employ different input beam arrangement and shapes. For example, the input beam can have an elliptical profile having a large aspect ratio to illuminate a row or column of the SLM, with subsections of the row or column defining sources for the intermediate beams. In any case, beam shaping and/or focusing optics, e.g., lenses, curved mirrors, apertures, etc., can be positioned before the SLM to produce a desired profile for the input beam on the SLM. Generally, the input beam arrangement can be selected to optimize the spatial extent and/or spatial resolution of the SLM. For example, in the embodiment shown in FIGS. 1a, 1b, 1c, and 2, each subsection 114 of SLM 110 includes multiple elements 116, whereas in other embodiments, one or more of the subsections may include only a single element.

SLM 110 in the embodiment shown in FIGS. 1a, 1b, 1c, and 2 is a transmission-type, liquid crystal SLM in which elements 116 in each subsection 114 selectively transmit the portion of input beam 130 incident on them. Such SLMs typically include a liquid crystal layer sandwiched between first substrate having a base electrode and a second substrate having a patterned array of electrodes that define the spatial extent of SLM elements 116. Each element 116 is coupled to an electronic processor 170 that sends an electrical signal to the element to vary its optical properties (e.g., the birefringence or scattering properties of the liquid crystals in the element). The SLM may further include a polarizer positioned before the first substrate and after the second substrate to block transmission of light selectively retarded by the liquid crystals (LCs) in an SLM element. The liquid crystal layer can include, e.g., nematic LCs or ferroelectric LCs.

In other embodiments, the SLM can also be a reflective-type, LC SLM, in which one layer in the SLM is made reflective, e.g., the base electrode substrate. In such cases, the elements in each subsection of the SLM selectively reflect the portion of the input beam incident on them. Reflective LC SLMs, and reflective SLMs in general, can permit folded geometries for the optical crossbar switch. LC SLMs are well known in the art, and are commercially available from a number of companies, see, e.g., the fast ferroelectric LCD (FELCD) from DisplayTech, Inc. (Colorado, USA), and other LC SLMs from Cambridge Research and Instrumentation, Inc. (Massachusetts, USA), Meadowlark Optics, Inc. (Colorado, USA), and Kopin Corporation (Massachusetts, USA).

Other embodiments for the SLM are also possible. For example, the SLM can be a micro electromechanical system (MEMS) device such as an array of separately addressable, deformable mirrors. In such embodiments, the elements in each subsection of the SLM selectively redirect the portion of the input beam incident on them along one of multiple directions (e.g., two directions). Thus, in some of such embodiments, the elements in each subsection of the SLM selectively direct the portion of the input beam incident on them to the corresponding pattern on the DOE or to a beam stop. Alternatively, in others of such embodiments, the elements in each subsection of the SLM selectively direct the portion of the input beam incident on them to one or multiple corresponding patterns on the DOE. Further embodiments can include MEMS-based SLMs operating in a reflection mode. MEMS-based SLMs are also well-known in the art and commercially available, see, e.g., the deformable mirror device (DMD™) available from Texas Instruments Corporation (Texas, USA), the thin-film micromirror actuated array (TMA) from Daewoo (Korea), and the grating light valve (GLV) from Silicon Light Machines (California, USA).

For example, the grating light valve (GVL) pixel is an addressable diffraction grating created by moving microscopic planar structures. A typical GLV pixel includes a number of parallel, dual-supported ribbons formed of silicon nitride and coated with a reflective aluminum top-layer. These ribbons are suspended above a thin air gap allowing them to move vertically relative to the plane of the surface. The ribbons are held in tension, such that in their unaddressed state, the surfaces of the ribbons collectively function as a mirror. A GLV pixel is addressed by inducing a voltage potential between the top of the ribbons and the substrate, thereby deflecting alternate ribbons. Viewed in one cross-section, the up/down pattern of reflective surfaces caused by the voltage creates a square-well diffraction grating that can redirect an incident beam by diffraction.

The structure of the pixels in the thin-film micromirror actuated array (TMA), on the other hand, includes a reflective metal on a bi-material strip in which one of the materials is a piezoelectric ceramic, e.g., platinum zirconium titinate. Application of a voltage ranging from 0–10 volts to the piezoelectric layer causes it to change its length, which in turn causes the reflective metal on top of the pixel to change its position, e.g., to rotate by up to 4°. Each pixel in the TMA provides gray-scale control to continuously redirect an incident beam over a range of desired directions.

In any of the embodiments described above, the elements of the SLM can be arrayed as a square, rectangular, hexagonal, polygonal, or non-periodic array, as necessary to optimize system properties. Furthermore, the SLM can be a one-dimensional SLM.

The DOE in the embodiments described above includes multiple diffractive patterns to redirect the intermediate beams to corresponding targets. The multiple diffractive patterns, each having different beam-steering properties, can be fabricated on a single substrate to produce the DOE. As a result, the DOE allows the intermediate beams to be simultaneously redirected along different directions. Accordingly, the DOE can follow the SLM in optical series to accommodate a wide range of target locations, in a compact and versatile manner.

The patterns on the DOE may each be a one-dimensional grating. A grating has periodic modulation in its optical properties, such as, e.g., a periodic surface profile or thickness that varies the phase of an incident beam across the beam's wavefront, and/or a periodic coating pattern to vary the transmission or reflection of an incident beam across the beam's wavefront. The period of the modulation is typically on the order of the wavelength of light or less. The periodic modulation in amplitude and/or phase across the wavefront of a beam incident on the grating causes the beam to be redirected as a diffracted beam. Such redirection is given by the well-known diffraction equation for gratings:

$$a[\sin(\theta_i) - \sin(\theta_d)] = m\lambda \quad (1)$$

where a is the period of the grating, $\theta_i$ is angle of incidence of the beam onto the grating, $\theta_d$ is angle of diffraction of the beam from the grating, m is an integer denoting the order of diffraction, and $\lambda$ is the wavelength of the incident beam. The grating may be a transmission grating, for which the incident beam is diffracted in a forward direction, or the grating may be a reflection grating, for which the incident beam is diffracted in a backward direction.

The diffraction intensity for a selected diffractive order m can be optimized by tailoring the specific profile of the periodic grating pattern. For example, the grating may be a blazed grating, i.e., a grating having a periodically repeating triangular or sawtooth profile at angle (the blaze angle) that optimizes a selected diffraction order. Furthermore, the grating may be a holographic grating, i.e., a grating having a sinusoidal surface profile with a modulation depth that optimizes a selected diffraction order. The grating may also be another type of grating well known in the art, e.g., an echelle grating or an echellon.

Thus, in some embodiments, each pattern on the DOE is a one-dimensional grating having a period and modulation selected to redirect the intermediate beam corresponding to the pattern to its corresponding target as an output beam. Furthermore, the angular orientations of the one-dimensional grating patterns on the DOE substrate may differ to redirect their corresponding intermediate beams along their desired directions. Moreover, in some embodiments, the DOE may include some patterns that are reflection gratings and others that are transmission gratings. Furthermore, not all of the patterns on the DOE need to be diffractive. For example, one or more of the patterns, among other diffractive patterns, may simply transmit or reflect the intermediate beam to the target, in which case the pattern is a uniform pattern. This may be thought of as zeroth order diffraction (m=0).

The patterns on the DOE may also include diffractive patterns more complicated than a standard one-dimensional grating. For example, one or more patterns may be a "chirped" grating, which is a grating whose period (e.g., line density) gradually changes across the length of the grating. In such chirped gratings, the deflection of an incident beam will vary depending on where along the grating length the incident beam contacts the grating. Furthermore, the diffractive pattern may be a two-dimensional grating. The diffractive patterns may also be designed to shape the transverse profile of each redirected beam, e.g., to focus or defocus the beam. Inverse calculations based on diffraction can be used to calculate appropriate features for the DOE patterns. Generally, each diffractive pattern includes a surface profile and/or thickness variation sufficient to diffract an incident beam, e.g., a visible or infrared beam. Suitable wavelengths for the incident beam may include, e.g., wavelengths in the range of about 400 nm to about 2500 nm, or more particularly, e.g., wavelengths in the range of about 500 nm to about 900 nm and/or in the range of about 1300 to about 1700 nm.

The patterns on the DOE may be spatially separated from one another, or some or all of the patterns may overlap or be continuous with one another. Also, the DOE generally includes a substrate that supports or incorporates the patterns. The DOE substrate may be flat or curved to facilitate additional beam steering or focusing. The diffractive patterns can be formed on or in the substrate using techniques well-known in the art, such as photolithography, etching, coating, electrochemical deposition, and electron beam lithography. Accordingly, the DOE is prefabricated. In other embodiments, the DOE can be an addressable SLM having an element resolution sufficient to diffract incident beams.

The embodiments described above for a 1×N optical crossbar switch can readily be extended to an M×N optical crossbar switch. In particular, rather than processing only a single input beam, multiple input beams can be processed in parallel using additional sections of the SLM and additional regions of the DOE. Thus, M optical input beams each illuminate a separate section of the SLM, and each SLM section couples at least a portion of that input beam to a corresponding region of the DOE. Further, each DOE region includes a set of N patterns for redirecting an incident beam to a corresponding one of N output targets.

For the M×N optical crossbar switch, the illuminated sections of the SLM can be selected to optimize the throughput of the SLM, which may depend on the arrangement of the elements on the SLM. For example, the illuminated sections of the SLM may form a row, a column, a rectangular array, a hexagonal array, etc. The beam steering operations described above are then repeated for each input beam, with a member of each set of N patterns of the DOE redirecting a corresponding intermediate beam to a common target.

Figure 3A:
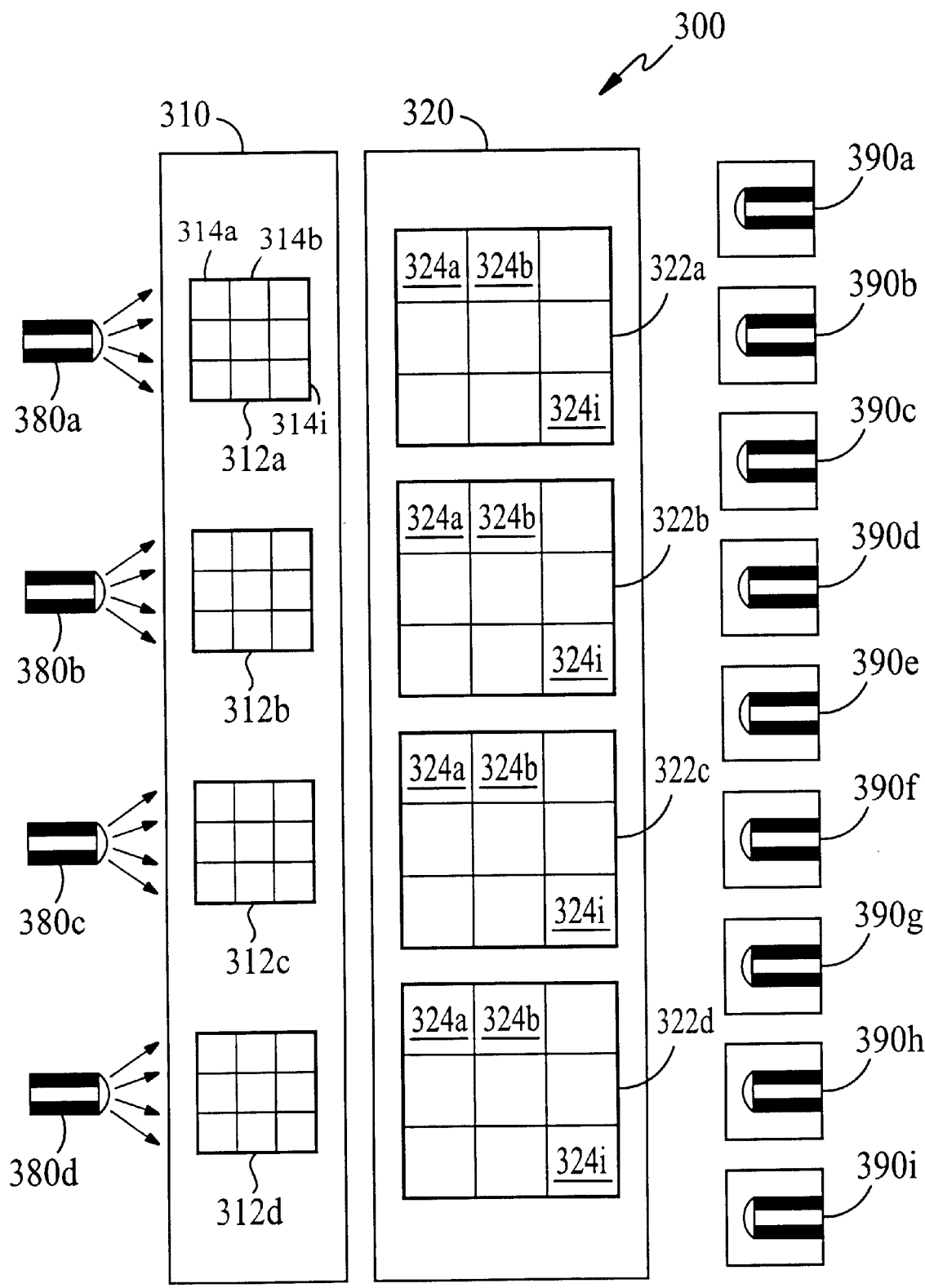
FIGS. 3a and 3b are schematic diagrams of a M×N optical crossbar switch.
Figure 3B:
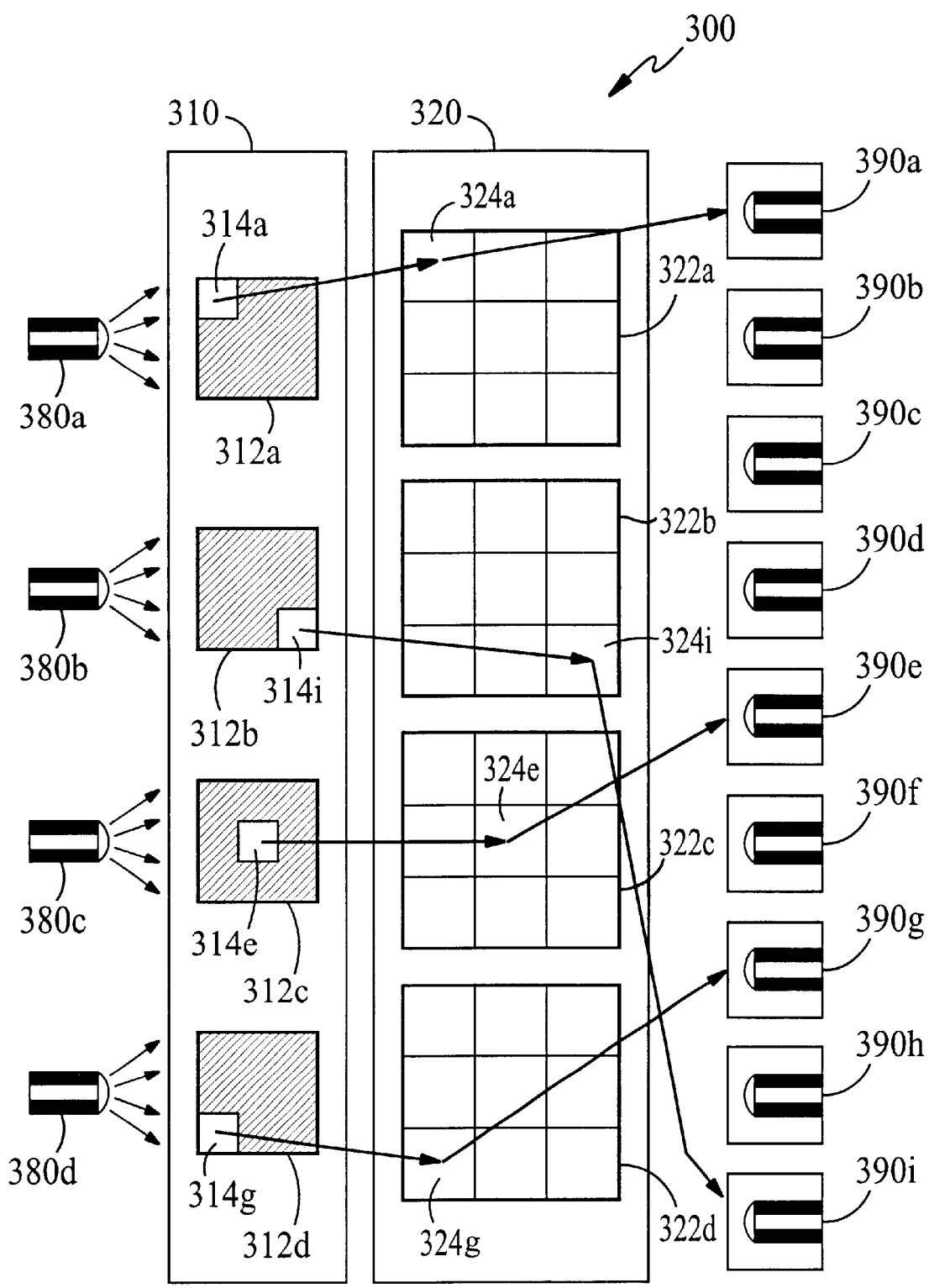

An embodiment of such an M×N optical crossbar switch is schematically depicted in FIGS. 3a and 3b. Referring to FIG. 3a, a 4×9 optical crossbar 300 receives M=4 optical input beams from a set or input fibers 380, illustrated as fibers 380a through 380d. The optical input beam from each fiber illuminates a corresponding section 312a, 312b, 312c, and 312d of a two-dimensional SLM 310. The M=4 sections of the SLM are each divided into N=9 subsections. For example, section 312a is divided into subsections 314a, 314b, . . . to 314i, and similarly for the other sections of the SLM. The SLM is otherwise identical to that described in the embodiment of FIGS. 1a, 1b, 1c, and 2. A diffractive optical element 320 is positioned after SLM 310.

In the presently described embodiment, only one SLM subsection of each section is held in a state that couples incident light towards DOE 320. In other words, for the 4×9 switch, one subsection on each SLM section is in an "on" state, resulting in 4 subsections that pass light to the DOE 320. The remaining 32 subsections are in an "off" state that prevents incident light from coupling to DOE 320.

DOE 320 includes M=4 regions of diffractive patterns (e.g., gratings) 322a, 322b, 322c, and 322d each having N=9 diffractive patterns. For example, region 322a includes subregions 324a, 324b, . . . , 324i, which each include a diffractive pattern, and similarly for the other regions of the DOE. The patterns in the subregions of every region each direct an intermediate beam to a corresponding target, e.g., one of output fibers 390a, 390b, . . . 390i. Accordingly, for each region of the DOE, there is a one-to-one mapping between the subregions in that region and the output targets. This property may also be described as follows. The M×N patterns of the DOE can be separated into M subsets, with the members of each subset directing an intermediate beam to a particular one of the targets, and with each subset including a pattern from each region of the DOE. For example, the pattern in subregion 324a of region 322a, the pattern in subregion 324a of region 322b, the pattern in subregion 324a of region 322c, and the pattern in subregion 324a of region 322d define a subset of the patterns of the DOE that redirect an incident intermediate beam to output fiber 390a.

FIG. 3b is a schematic diagram of an example of optical crossbar 300 during operation. In the example, SLM 310 is addressed to route the signals from input fibers 380a, 380b, 380c, and 380d to output fibers 390a, 390i, 390e, and 390g, respectively. In particular, input fiber 380a floods SLM section 312a with data. Because it is intended that data from input fiber 380a be routed to output 390a, only SLM subsection 314a of section 312a is "on" to thereby transmit the data to subregion 324a in region 322a of DOE 320. The diffractive pattern in subregion 324a, in turn, redirects the data to its corresponding target, output fiber 390a. The device operates in an analogous fashion for the remaining input fibers.

In further operation, the mapping of the optical signals from the input fibers to the output fibers may be switched by switching the transmissive subsection in each section of the SLM. For example, data from input fiber 380a can be switched from output fiber 390a to output fiber 390b by switching SLM subsection 314a in section 312a to the "off" state and SLM subsection 314b in section 312a to the "on" state. As a result, the data is transmitted to DOE subregion 324b in region 322a, which steers the light to output fiber 390b.

Figure 4:
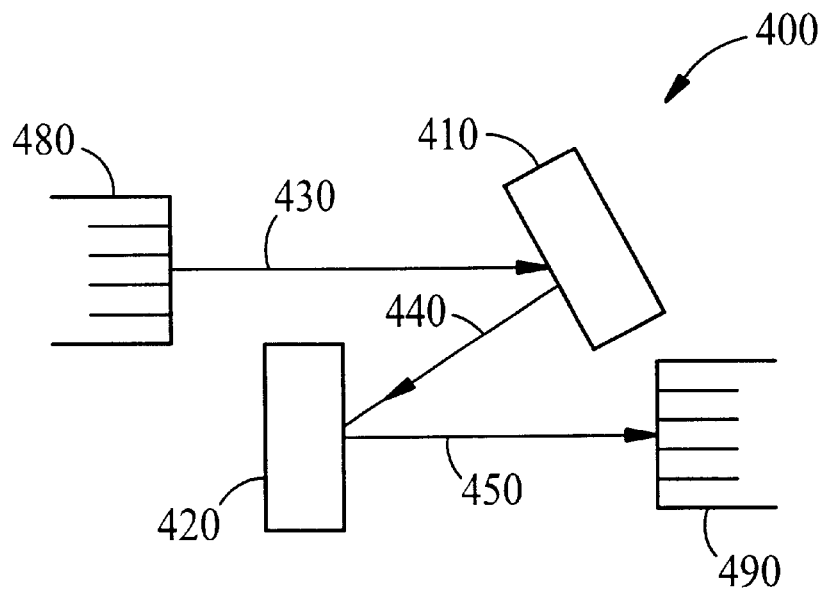
FIG. 4 is a schematic diagram of another embodiment of the M×N optical crossbar switch.

In the embodiments described with reference to FIGS. 1a–1c, 2, and 3a–3b, the SLM and DOE both operate in a transmission mode. As described above, however, one or both of the SLM and DOE may operate in a reflective mode. For example, an M×N optical crossbar switch 400 includes a reflective SLM 410 and a reflective DOE 420, as shown in FIG. 4, and can operate similarly to that described above to redirect input beams 430 from M input fibers 480 to N output fibers 490 as output beams 450. SLM 410 reflects portions of the M input beams 430 to DOE 420 as intermediate beams 440, and DOE 420 diffracts intermediate beams 440 in a backward direction to output fibers 490 as output beams 450.

Figure 5:
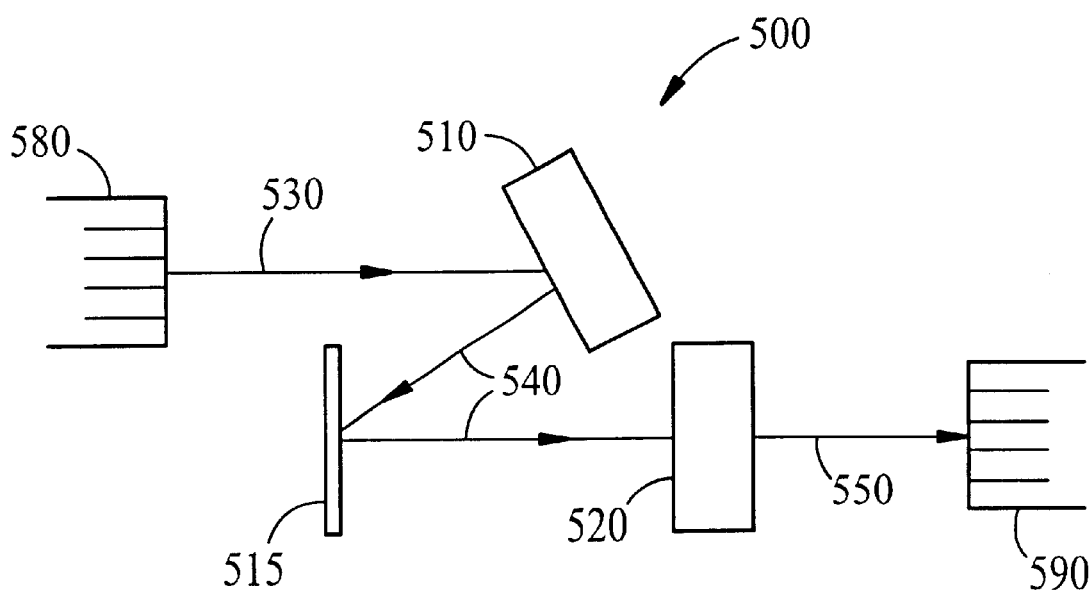
FIG. 5 is a schematic diagram of another embodiment of the M×N optical crossbar switch.

Furthermore, in other embodiments, involving either reflective or transmissive SLMs and DOEs, one or more intermediate optics may be placed between the SLM and the DOE. For example, an M×N optical crossbar switch 500 includes a reflective SLM 510 and a transmissive DOE 520, as shown in FIG. 5. Switch 500 operates similarly to that described above to redirect input beams 530 from M input fibers 580 to N output fibers 590 as output beams 560, except that a mirror 515 is positioned between the SLM and DOE to redirect intermediate beams 540. In further embodiments, the intermediate optic can be, e.g., any of a curved mirror, a lens, a microlens array, a beam splitter, a polarizer, and a wave plate.

Moreover, in additional embodiments, one or more additional optics can be positioned between the input beam sources (e.g., the optical fibers) and the SLM. For example, the one or more optics can include a focussing optic, fiber optic coupler, polarization optics, a DOE (e.g., one such as DOE 120, 220, and 320 described above), a lens array, beamsplitter, etc.

Figure 6:
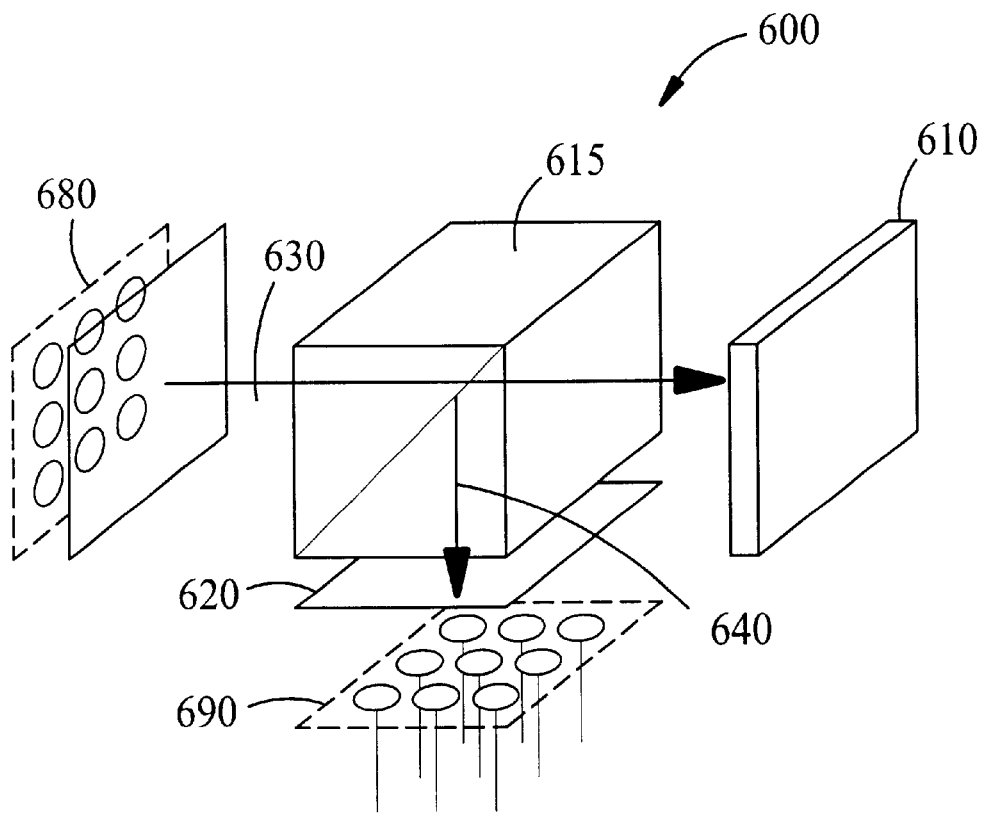
FIG. 6 is a schematic diagram of another embodiment of the M×N optical crossbar switch.

For example, in the embodiment shown in FIG. 6, an M×N optical crossbar switch 600 includes a reflective SLM 610, a transmissive DOE 620, and beam splitter 615. In this embodiment, SLM 610 is configured to operate with normally incident input beams 630 derived from input fibers 680. Accordingly, beam splitter 615 is positioned to transmit input beams 630 to SLM 610 and reflect intermediate beams 640 to DOE 620, which redirects them as output beams to output fibers 690. In this embodiment, the beam splitter can be considered an intermediate optic between the input fibers and the SLM, and between the SLM and the DOE. In the presently described embodiment, beam splitter 615 is a non-polarizing beam splitter. In other embodiments, it may be a polarizing beam splitter and one or more polarization optics (e.g., waveplates) may positioned as appropriate, e.g., a quarter wave plate can be positioned between the beam splitter and the SLM.

Figure 7A:
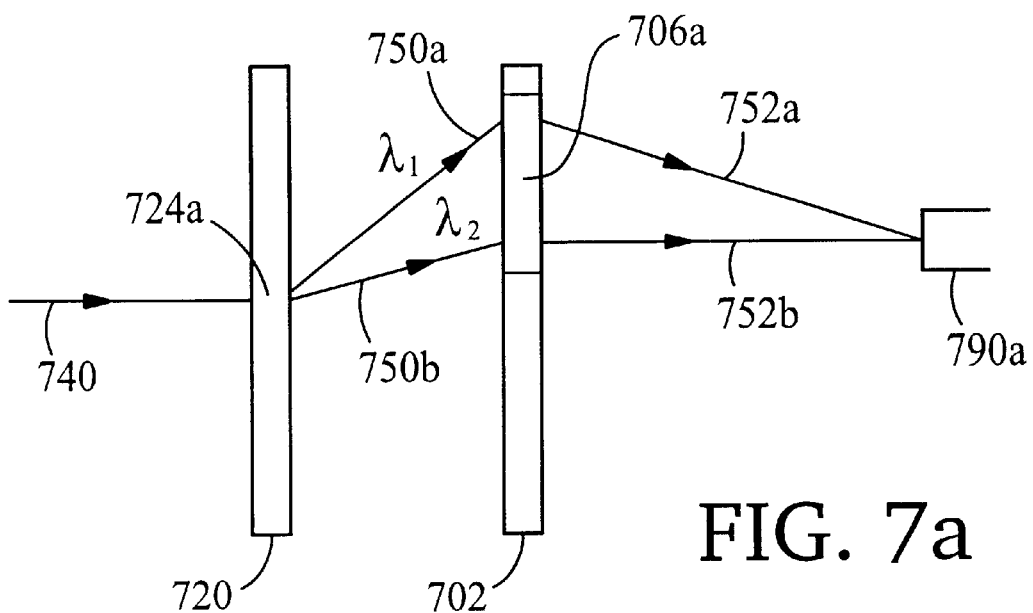
FIGS. 7a and 7b are schematic diagrams of an embodiment of the M×N optical crossbar switch that employs a second DOE to compensate for the wavelength-dependent beam-steering deviations.

Furthermore, in additional embodiments, the optical crossbar switch can include a second DOE positioned after the first DOE to compensate for the wavelength dependence of the first DOE. In particular, as shown in Equation 1, the diffraction angle for a grating is wavelength dependent. For example, referring to FIG. 7a, the diffractive pattern in subregion 724a of DOE 720 redirects intermediate beam 740 differently depending on whether the wavelength of beam 740 is $\lambda_1$ or $\lambda_2$, as indicated by first output beams 750a and 750b, respectively. To compensate for the wavelength dependent deviation, a second DOE 702 can include a subregion 706a corresponding to subregion 724a of DOE 720, which compensates for the divergence between beams 750a and 750b by redirecting them to a common target, e.g., output fiber 790a, as second output beams 752a and 752b, respectively.

The appropriate diffractive pattern for subregion 706a can be determined using standard ray tracing techniques. For example, the wavelength dependence of the lateral displacement of the output beam at the target can be determined based on: the incident angle of the intermediate beam on the subregion of the first DOE, the wavelength of the intermediate beam, the diffractive properties of the pattern in that subregion (e.g., the line spacing a and diffractive order m), the separation between the first DOE and the second DOE, the diffractive properties of the pattern in the subregion of the second DOE, and the separation between the second DOE and the target. Thus, the diffractive properties of the pattern in the subregion of the second DOE are optimized to minimize the lateral displacement as a function of wavelength. Typically, the optimization will be with reference to a central wavelength. Thus, the diffractive pattern can be optimized to minimize the first derivative, and where possible higher derivatives, of the lateral displacement as a function of wavelength at the central wavelength. For example, when the diffractive pattern is a simple grating, the line spacing a can be selected to minimize the first derivative at the central wavelength. Furthermore, for example, when the diffractive pattern is a chirped grating, the line spacing and chirp can be selected to minimize the first and second derivatives at the central wavelength. The second DOE includes a subregion corresponding to each subregion in the first DOE, and the optimization is repeated for each subregion of the second DOE.

Figure 7B:
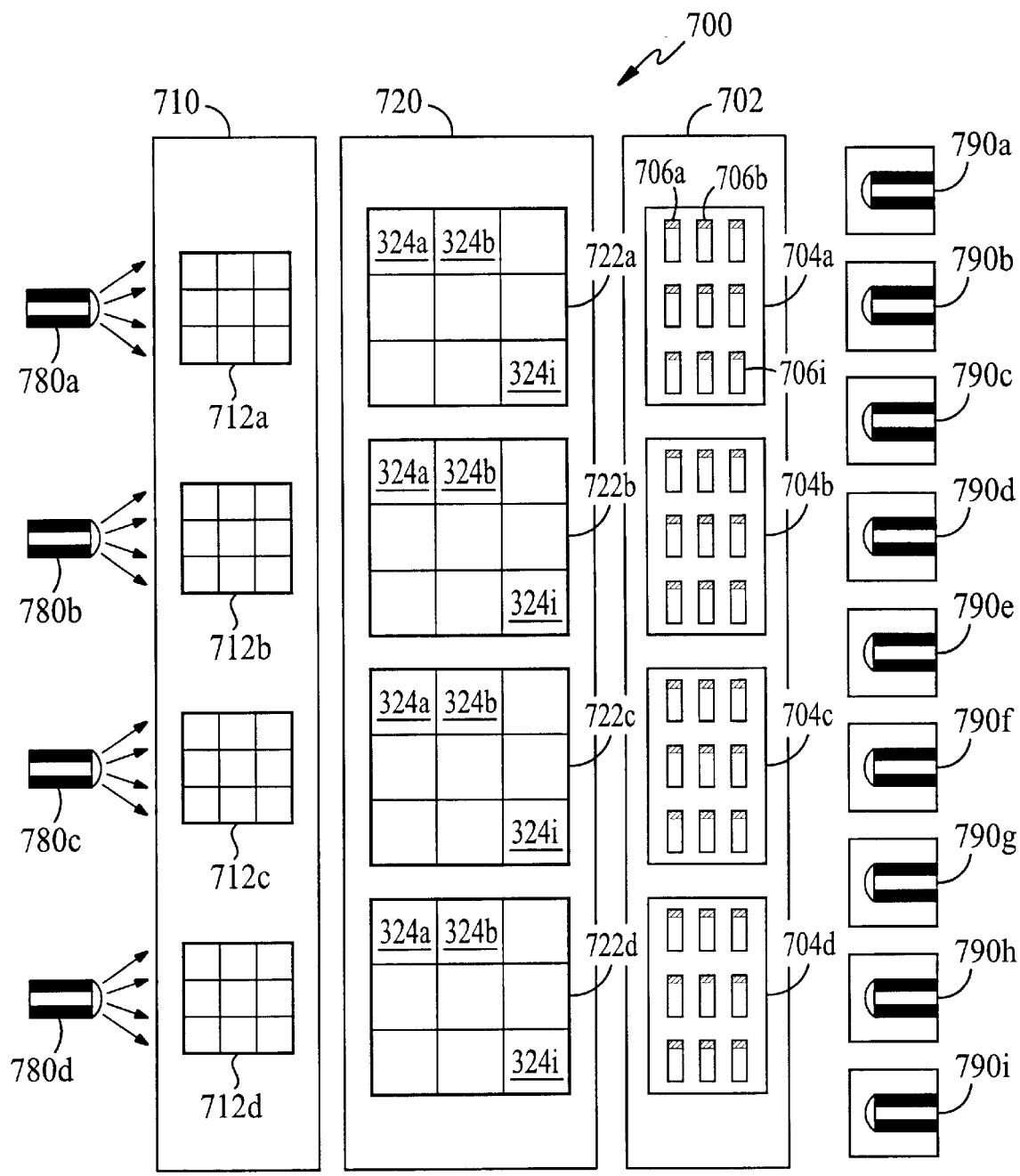

Referring to FIG. 7b, an M×N optical crossbar switch 700 is shown that includes an SLM 710 similar to SLM 310, a first DOE 720 similar to DOE 320, and a second DOE 702 that includes M=4 regions 704a, 704b, 704c, and 704d, each having subregions 706a, 706b, . . . 706i. Each subregion in second DOE 702 includes a diffractive pattern that compensates for the wavelength dependent beam steering of the pattern in a corresponding subregion of first DOE 720. Other aspects of crossbar switch 700, including SLM sections 712a–712d, SLM subsections 714a–714i, input fibers 780a–780d and output fibers 790a–790i, are the same as those described above for switch 300.

Figure 8:
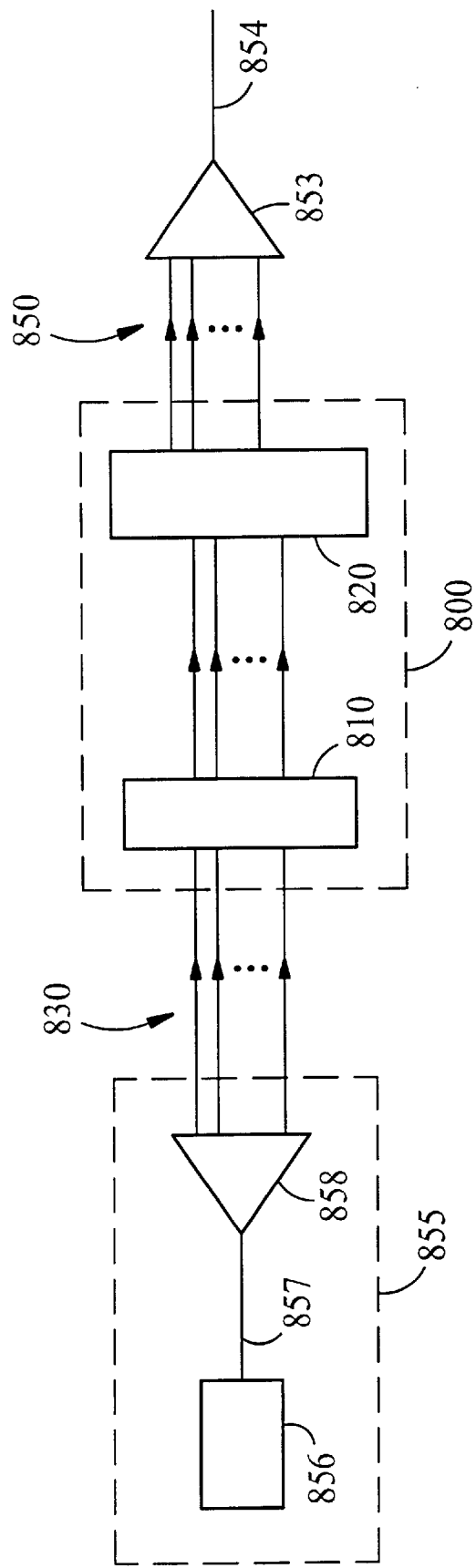
FIG. 8 is a schematic diagram of a wavelength division multiplexing system employing an optical crossbar switch.

Any of the optical crossbar switch embodiments described above can be used in a wavelength division multiplexing (WDM) optical network. For example, referring to FIG. 8, a source 855 includes a laser source 856, an input optical fiber 857, and a wavelength division demultiplexer 858. Laser source 856 provides modulated optical signals for multiple wavelengths and couples the optical signals to optical fiber 857, which carries the optical signals to demultiplexer 858. The demultiplexer separates spatially the multiple wavelengths to generate M input beams 830, which are incident on M×N optical crossbar switch 800. As described above, optical crossbar switch 800 includes an SLM 810 and a DOE 820. Switch 800 redirects each of the M input beams along one of N output paths 850 incident on a wavelength division multiplexer 853. The multiplexer spatially recombines those output beams incident on it and couples them to an output optical fiber 854. Wavelength division multiplexing and such components are well known in the art, see, e.g., R. Ramaswami and K. N. Sivarajan in *Optical Networks,* chapter 3, Morgan Kaufman Publishers, Inc., San Francisco, 1998.

Other aspects, advantages, modifications are within the scope of the following claims. For example, because the SLM may only couple a portion of each input beam to the DOE, one or more optical amplifiers may be incorporated into the system to amplify the signals in the output beams to levels comparable to those of the signals in the input beams.

What is claimed is:

1. An optical crossbar switch system comprising:
   a mask comprising multiple patterns, wherein at least one of the multiple patterns is a diffractive pattern; and
   a spatial light modulator positioned to receive at least one optical input beam and selectively couple at least a portion of each of the at least one input beam to one of the patterns of the mask, each coupled portion defining an intermediate beam,
   wherein each pattern, when selected by the spatial light modulator, is configured to redirect the intermediate beam to one of N targets, where N is an integer greater than two.

2. The system of claim 1, wherein the at least one optical input beam is M optical input beams, where M is an integer greater than one.

3. The system of claim 2, wherein
   the mask comprises M regions, each pattern being in one of the M regions,
   there is a one-to-one correspondence between the M input beams and the M regions, and
   the spatial light modulator is positioned to selectively couple the at least a portion of each input beam to the corresponding region of the mask.

4. The system of claim 3, wherein
   the multiple patterns comprise M×N patterns, with each region including N of the multiple patterns,
   there is a one-to-one correspondence between the N patterns in each region of the mask and the N targets, and
   each pattern in each region of the mask, when selected by the spatial light modulator, is configured to redirect the intermediate beam to the corresponding target.

5. The system of claim 1, wherein the modulator comprises an array of multiple elements.

6. The system of claim 5, wherein the multiple elements are individually, electronically controllable to cause the spatial light modulator to selectively couple the at least a portion of each input beam to the corresponding one of the multiple patterns.

7. The system of claim 5, wherein each of the multiple elements comprises a reflective component having an adjustable orientation.

8. The system of claim 5, wherein each of the multiple elements adjustably varies the magnitude of transmission of an incident beam.

9. The system of claim 5, wherein each of the multiple elements adjustably varies the magnitude of reflection of an incident beam.

10. The system of claim 5, wherein each of the multiple elements comprises a liquid crystal cell.

11. The system of claim 10, wherein the liquid crystal cell adjustably varies the polarization of an incident beam.

12. The system of claim 11, wherein each element of the spatial light modulator comprises a polarizer.

13. The system of claim 5 further comprising an electronic processor coupled to the spatial light modulator to cause the modulator to selectively couple the at least a portion of each input beam to the corresponding one of the multiple patterns.

14. The system of claim 5, wherein the array of multiple elements is a one-dimensional array.

15. The system of claim 5, wherein the array of multiple elements is a two-dimensional array.

16. The system of claim 5, wherein the array of multiple elements is a hexagonal array.

17. The system of claim 5, wherein the spatial light modulator is positioned to receive each of the at least one input beam on a substantially circular section of the elements.

18. The system of claim 5, wherein the spatial light modulator is positioned to receive each of the at least one input beam along a row of the elements.

19. The system of claim 5, wherein the modulator is positioned to receive each of the at least one input beam along a column of the elements.

20. The system of claim 1, wherein at least some of the multiple patterns of the mask are diffractive patterns.

21. The system of claim 1, wherein all of the multiple patterns of the mask are diffractive patterns.

22. The system of claim 1, wherein the patterns on the mask are spatially separated from one another.

23. The system of claim 3, wherein the M regions on the mask are spatially separated.

24. The system of claim 1, wherein the diffractive pattern is a grating pattern.

25. The system of claim 1, wherein the diffractive pattern is a transmissive diffractive pattern.

26. The system of claim 1, wherein the diffractive pattern is a reflective diffractive pattern.

27. The system of claim 24, wherein the grating pattern is optimized for a particular order of diffraction.

28. The system of claim 27, wherein the grating pattern is optimized for first order diffraction.

29. The system of claim 24, wherein the grating pattern is a blazed grating pattern.

30. The system of claim 24, wherein the grating pattern is a holographic grating pattern.

31. The system of claim 1, wherein the diffractive pattern comprises phase-modulation.

32. The system of claim 1, wherein the diffractive pattern comprises amplitude-modulation.

33. The system of claim 1, wherein the diffractive pattern comprises phase-modulation and amplitude modulation.

34. The system of claim 1, wherein the diffractive pattern is defined by an etched pattern on the mask.

35. The system of claim 1, wherein the diffractive pattern is defined by a coated pattern on the mask.

36. The system of claim 1, wherein the mask is flat.

37. The system of claim 1, wherein the mask is curved.

38. The system of claim 1, further comprising an intermediate optic positioned between the spatial light modulator and the mask.

39. The system of claim 38, wherein the intermediate optic is one of a mirror, a lens, a microlens array, a polarizer, a wave plate, and a beam splitter.

40. The system of claim 2 further comprising a source for the M input optical beams.

41. The system of claim 40, further comprising an intermediate optic positioned between the source and the spatial light modulator.

42. The system of claim 41, wherein the intermediate optic is one of a mirror, a lens, a microlens array, a polarizer, a wave plate, and a beam splitter.

43. The system of claim 40, wherein the source comprises an array of optical input fibers, each fiber carrying one of the optical input beams.

44. The system of claim 43, wherein the source further comprises a laser source optically coupled to the optical fiber array.

45. The system of claim 40, wherein the M optical input beams each have a different wavelength, and wherein the source comprises an input fiber carrying optical signals at different wavelengths and a wavelength division demultiplexer optically coupled to the fiber for separating the optical signals into at least some of the M optical input beams.

46. The system of claim 45, wherein the source further comprises a laser source optically coupled to the fiber.

47. The system of claim 1 further comprising an array of N optical output fibers, which define the N targets.

48. The system of claim 1 further comprising an array of N detectors, which define the N targets.

49. The system of claim 1 further comprising a wavelength division multiplexer having N inputs, which define the N targets, and an output fiber coupled to the wavelength division multiplexer for carrying optical signals derived from the output beams.

50. The system of claim 1, where in the patterns on the mask are prefabricated.

51. The system of claim 4, wherein M=N.

52. The system of claim 1, wherein the at least one optical input beam is one optical input beam, the multiple patterns comprise N patterns, wherein there is a one-to-one correspondence between the N patterns and the N targets, and each pattern, when selected by the spatial light modulator, is configured to redirect the intermediate beam to the corresponding target.

* * * * *